W. H. JOYNER.
SPRING TIRE.
APPLICATION FILED MAY 15, 1917.
1,277,938.
Patented Sept. 3, 1918.
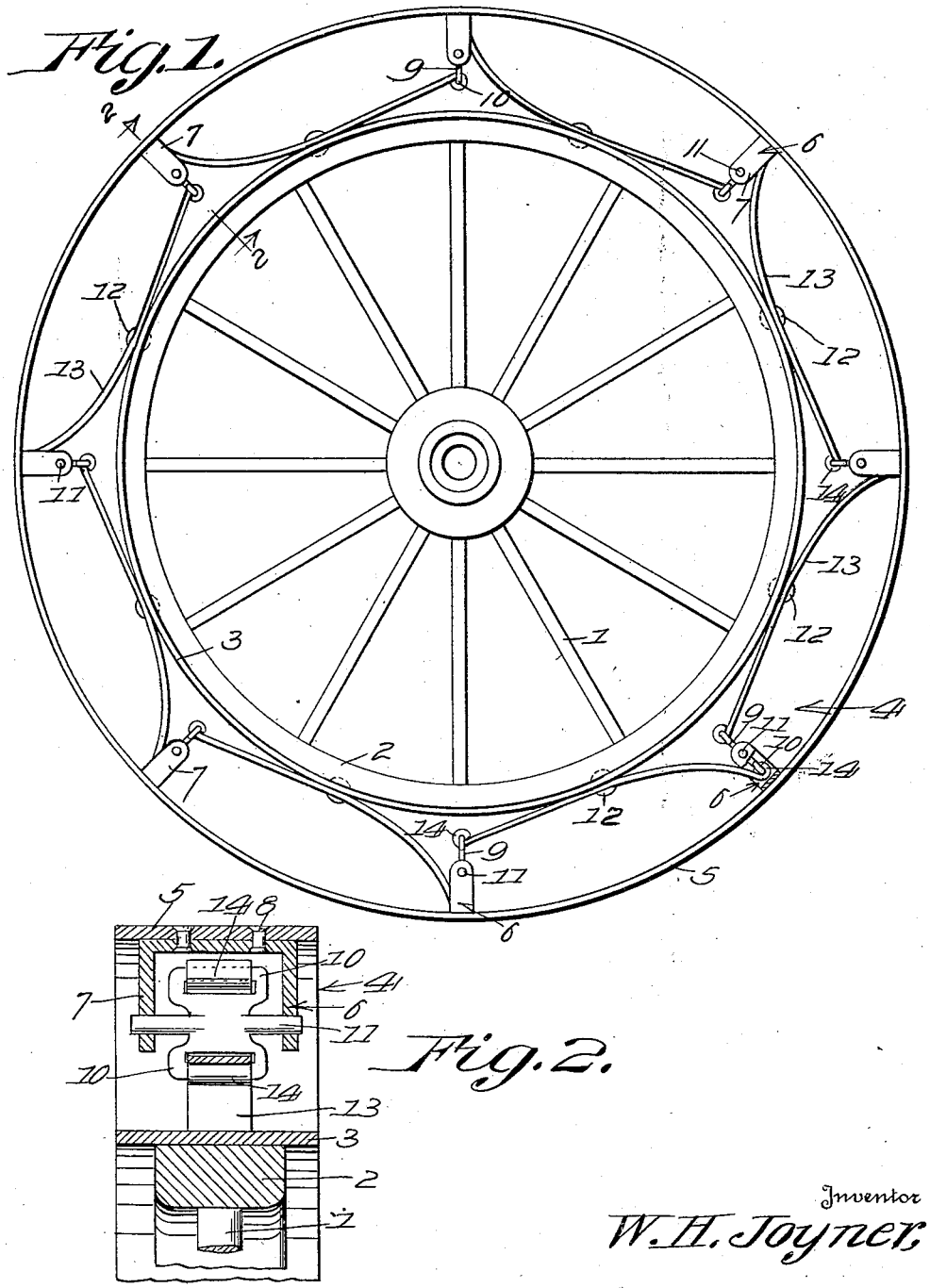

UNITED STATES PATENT OFFICE.

WILLIAM HENLEY JOYNER, OF EAST BERNSTADT, KENTUCKY.

SPRING-TIRE.

1,277,938.  Specification of Letters Patent.  Patented Sept. 3, 1918.

Application filed May 15, 1917. Serial No. 168,809.

*To all whom it may concern:*

Be it known that I, WILLIAM HENLEY JOYNER, a citizen of the United States, residing at East Bernstadt, in the county of Laurel and State of Kentucky, have invented certain useful Improvements in Spring-Tires, of which the following is a specification, reference being had therein to the accompanying drawing.

This invention aims to provide a novel vehicle tire wherein the resiliency is produced by springs so mounted on the rim of the wheel that the lines of force thereof as opposing the depression of the tire will form a couple about a fixed axis through which the depressional movement of the tire is imparted to the springs.

A coördinate object of the invention is to provide in conjunction with equalizing bars for springs within a tire, suitable bearings for the bars through which the burden of the forces consequent to the action between the springs and the tire will be centered and distributed to the operative elements of the invention.

With the above and other objects in view, the present invention consists in the combination and arrangements of parts hereinafter more fully described, illustrated in the accompanying drawings, and particularly pointed out in the appended claim, it being understood that changes may be made in the form, proportion, size and minor details without departing from the spirit of the invention.

In the drawing:

Figure 1 is an elevational view of the invention.

Fig. 2 is a transverse sectional view on the line 2—2 of Fig. 1.

Referring now more particularly to the accompanying drawings, like characters of reference indicate like or similar parts throughout the several views.

Mounted upon the spokes 1 of a vehicle wheel is the usual felly 2 and rim 3 upon which is carried a resilient tire 4 having a continuous metallic tread 5. As none of the above elements are the subject matter of the present invention and may be constructed in any suitable manner, details thereof have been omitted.

A plurality of spaced apart U-shaped brackets 6 having the parallel arms 7 are secured as at 8 to the metallic tread 5 of the tire 4. Equalizing bars 9 having terminal eyes 10 are provided with trunnions 11 journaled for free movement in eyes formed in the arms 7. Secured by bolts 12 or other suitable means to the rim 3 are a plurality of plate springs 13 of a size depending upon the load they are required to support. The terminal ends of the springs 13 are bent upon themselves as at 14 for pivotal engagement with pintles left by the formation of the eyes 10 in the equalizing bars 9. Adjacent terminals of the springs 13 engage opposite pintles of the equalizing bars 9.

It will be observed that the springs 13 between their points of connection with the rim 3 and those pintles of the bars which are nearer the said rim are substantially straight and are tangentially disposed with reference to the rim 3. The remaining portion of each spring is curved outwardly away from the rim 3 to connect with its equalizing bar on that pintle which is nearer the tread 5. Thus each spring 13 on one side of the screw or fastening device 12 is straight while on the other side of said fastening device is curved. With this construction, the strain in the fibers of the metal of which the springs are made will always be the same, since the curved portions of the springs will be opened, and the straight portions curved upon the application of a force to the tread 5. Therefore, the fibers on the inside and outside of the curved portion of each spring are relaxed, while the fibers in the straight portion of the spring are bent, this relaxing of the fibers in the curved portion of the spring permitting the fibers in the straight portion to be bent by the curving of the straight portion of the spring, so that there is imparted substantially the same strain to the fibers on one face of the spring as are imparted to those on the other face.

It is obvious that the invention herein set forth is susceptible to changes and modifications involving mechanical skill which may be made within the scope of the claim, without departing from the spirit thereof. I do not, therefore, desire to be understood as limiting myself to the precise construction of the parts shown in the drawings.

What I claim is:

In a resilient tire structure, the combination with a vehicle wheel rim, of plate springs secured to the outer periphery of the rim at uniformly spaced points therearound, the point of attachment of each spring being substantially intermediate between its ends, a continuous metallic tread, U-shaped brackets secured to the tread on the inner face thereof and at uniformly spaced points therearound, and equalizing bars pivotally mounted in the U-shaped brackets, the equalizing bars having elongated eyes formed near their ends to provide pintles at their extremities, the springs having terminal return bends for pivotal engagement with the said pintles, the equalizing bars being normally radially disposed so that each spring may connect at one end with the outer pintle of one equalizing bar and at the other end with the inner pintle of the next succeeding equalizing bar, whereby each spring on one side of its connection with the rim is maintained normally tangent with the rim and on the other side of said connection caused to bend away from the rim, thereby permitting the tangentially disposed portion to be curved and the curved portion to be partially straightened when the tread is depressed.

In testimony whereof I affix my signature.

WILLIAM HENLEY JOYNER.